United States Patent
Demirjian

(10) Patent No.: US 8,326,744 B2
(45) Date of Patent: Dec. 4, 2012

(54) ELECTRONIC TRANSACTION SYSTEM AND METHOD

(76) Inventor: Teddy A. Demirjian, Purchase, NY (US)

( * ) Notice: Subject to any disclaimer, the term of this patent is extended or adjusted under 35 U.S.C. 154(b) by 0 days.

(21) Appl. No.: 13/429,035

(22) Filed: Mar. 23, 2012

(65) Prior Publication Data

US 2012/0185361 A1 Jul. 19, 2012

Related U.S. Application Data

(63) Continuation of application No. 13/366,138, filed on Feb. 3, 2012, which is a continuation of application No. 13/107,648, filed on May 13, 2011, now Pat. No. 8,112,352, which is a continuation of application No. 12/618,645, filed on Nov. 13, 2009, now Pat. No. 7,945,506, which is a continuation of application No. 12/326,031, filed on Dec. 1, 2008, now abandoned, which is a continuation of application No. 11/732,715, filed on Apr. 4, 2007, now abandoned, which is a continuation of application No. 09/658,332, filed on Sep. 8, 2000, now abandoned.

(60) Provisional application No. 60/152,920, filed on Sep. 8, 1999.

(51) Int. Cl.
*G06Q 40/00* (2006.01)
(52) U.S. Cl. ............................. 705/37; 705/35
(58) Field of Classification Search ............... 705/35, 705/37
See application file for complete search history.

(56) References Cited

U.S. PATENT DOCUMENTS

| | | | |
|---|---|---|---|
| 4,334,270 A | 6/1982 | Towers |
| 4,674,044 A | 6/1987 | Kalmus et al. |
| 4,694,397 A | 9/1987 | Grant et al. |
| 4,933,842 A | 6/1990 | Durbin et al. |
| 4,989,141 A | 1/1991 | Lyons et al. |
| 5,101,353 A | 3/1992 | Lupien et al. |
| 5,132,899 A | 7/1992 | Fox |
| 5,220,500 A | 6/1993 | Baird et al. |
| 5,270,922 A | 12/1993 | Higgins |
| 5,644,727 A | 7/1997 | Atkins |
| 5,706,499 A | 1/1998 | Kleewein et al. |
| 5,717,989 A | 2/1998 | Tozzoli et al. |
| 5,745,706 A | 4/1998 | Wolfberg et al. |
| 5,774,553 A | 6/1998 | Rosen |
| 5,826,243 A | 10/1998 | Musmanno et al. |
| 5,847,708 A | 12/1998 | Wolff |

(Continued)

FOREIGN PATENT DOCUMENTS

JP 2001175672 A 6/2001

OTHER PUBLICATIONS

Gralla, "How the internet works," *Que* (1999) pp. 256-259, 304-307.

*Primary Examiner* — Mary Cheung
*Assistant Examiner* — Daniel L Greene
(74) *Attorney, Agent, or Firm* — Knobbe, Martens, Olson & Bear LLP

(57) ABSTRACT

An Internet based system for executing transactions is described. The system may include transaction data, a database, a business logic manager and user profiles. A rules may also be included, and store information about system responses to modifications of the data. The user profiles may be configured to store information concerning the availability of information and displays depending upon the user.

15 Claims, 21 Drawing Sheets

U.S. PATENT DOCUMENTS

| | | |
|---|---|---|
| 5,864,828 A | 1/1999 | Atkins |
| 5,875,437 A | 2/1999 | Atkins |
| 5,893,079 A | 4/1999 | Cwenar |
| 5,918,213 A | 6/1999 | Bernard et al. |
| 5,918,217 A | 6/1999 | Maggioncalda et al. |
| 5,933,826 A | 8/1999 | Ferguson |
| 5,978,779 A | 11/1999 | Stein et al. |
| 6,012,044 A | 1/2000 | Maggioncalda et al. |
| 6,018,722 A | 1/2000 | Ray et al. |
| 6,021,397 A | 2/2000 | Jones et al. |
| 6,085,220 A | 7/2000 | Courts et al. |
| 6,119,104 A | 9/2000 | Brumbelow et al. |
| 6,128,602 A | 10/2000 | Northington et al. |
| 6,275,937 B1 | 8/2001 | Hailpern et al. |
| 6,292,933 B1 | 9/2001 | Bahrs et al. |
| 6,430,542 B1 | 8/2002 | Moran |
| 6,535,855 B1 | 3/2003 | Cahill et al. |
| 6,615,258 B1 | 9/2003 | Barry et al. |
| 6,629,082 B1 | 9/2003 | Hambrecht et al. |
| 6,957,186 B1 | 10/2005 | Guheen et al. |
| 7,171,386 B1 | 1/2007 | Raykhman |

View All Orders

| Row | Ticket ID | Type | Action | Ticker | Shares | Leaves | Instruction | Status |
|---|---|---|---|---|---|---|---|---|
| 14 | 39 | Equity | Buy | NOVL | 200 | 200 | Market Order | New |
| 15 | 43 | Equity | Buy | GRAMMY | 10 | 0 | Market Order | Filled |
| 16 | 44 | Equity | Buy | GRAMMY | 10 | 0 | Market Order | Filled |
| 17 | 45 | Equity | | | | 0 | Market Order | Filled |
| 18 | 46 | Equity | | | | 10 | Market Order | New |
| 19 | 47 | Equity | | | | 5 | Market Order | New |
| 20 | 48 | Equity | | | | 5 | Market Order | New |
| 21 | 49 | Equity | | | | 10 | Market Order | New |
| 22 | 50 | Equity | | | | | | |

Wizard Wrx Trader Alert

⚠ New Security Type
User Profile Modified

View All Orders

[Show Narrow Table]

| Row | Ticket ID | Type | Action | Ticker | Shares | Leaves | Instruction | Status |
|---|---|---|---|---|---|---|---|---|
| 14 | 39 | Equity | Buy | NOVL | 200 | 200 | Market Order | New |
| 15 | 43 | Equity | Buy | GRAMMY | 10 | 0 | Market Order | Filled |
| 16 | 44 | Equity | Buy | GRAMMY | 10 | 0 | Market Order | Filled |
| 17 | 45 | Equity | Sell | GRAMMY | 5 | 0 | Market Order | Filled |
| 18 | 46 | Equity | Sell | NOVL | 10 | 10 | Market Order | New |
| 19 | 47 | Equity | Buy | NOVL | 5 | 5 | Market Order | New |
| 20 | 48 | Equity | Buy | GRAMMY | 5 | 5 | Market Order | New |
| 21 | 49 | Equity | Sell | GRAMMY | 10 | 10 | Market Order | New |
| 22 | 50 | Equity | Sell | GRAMMY | 50 | 0 | Market Order | New |
| 23 | 51 | Option | | | | | | |

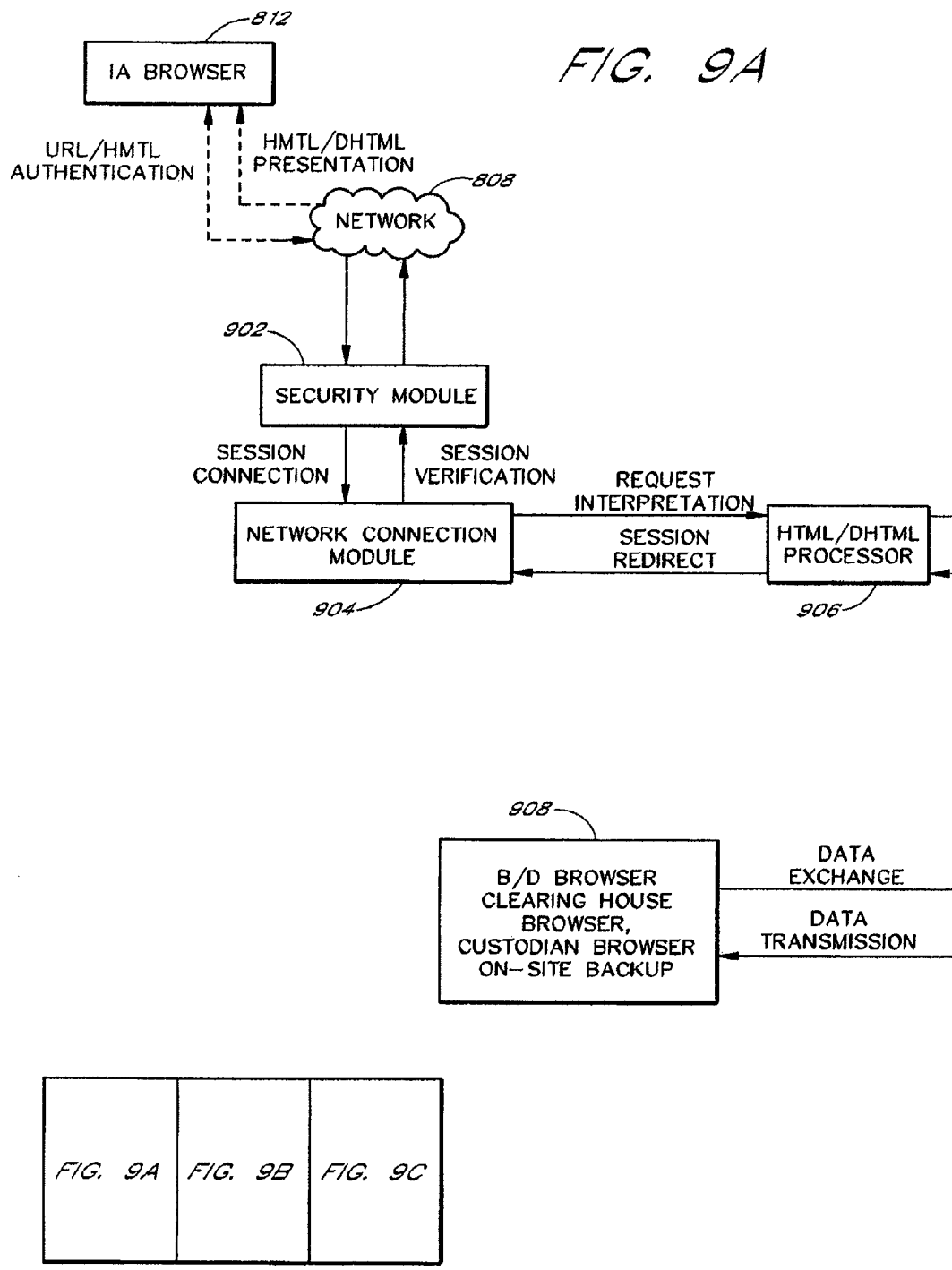

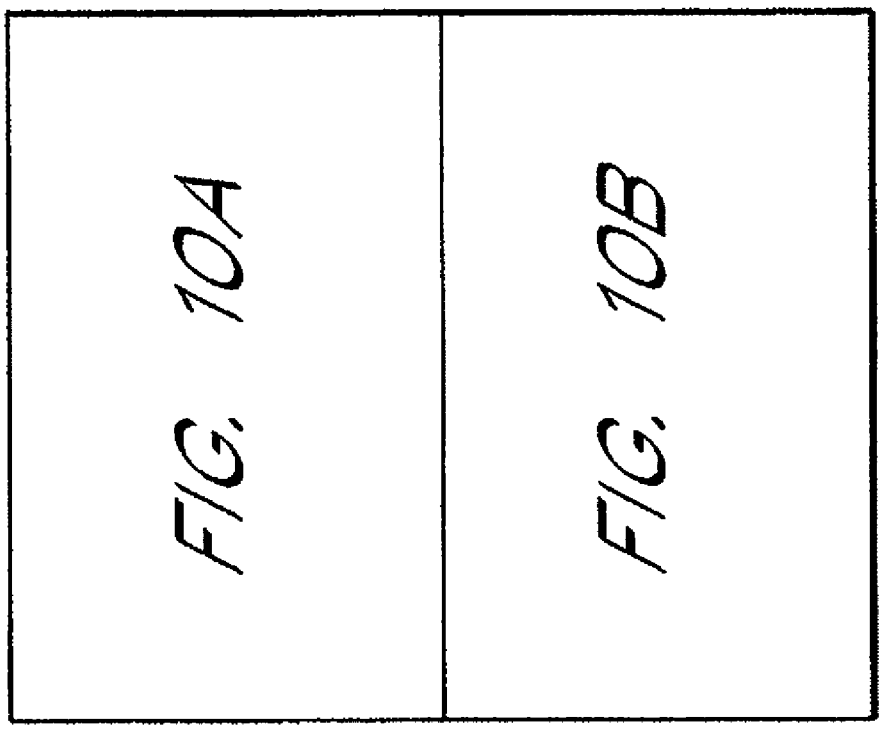

ELECTRONIC TRANSACTION SYSTEM AND METHOD

CROSS REFERENCE TO RELATED APPLICATIONS

This application is a continuation of U.S. patent application Ser. No. 13/366,138, which is a continuation of U.S. patent application Ser. No. 13/107,648, now issued U.S. Pat. No. 8,112,352, entitled "Electronic System and Method for Executing a Trade" which is a continuation of U.S. patent application Ser. No. 12/618,645, now issued U.S. Pat. No. 7,945,506, entitled "Transaction and Account Management System" which is a continuation of U.S. patent application Ser. No. 12/326,031, filed on Dec. 1, 2008, now abandoned, which is a continuation of U.S. patent application Ser. No. 11/732,715 filed on Apr. 4, 2007, now abandoned, which is a continuation of U.S. patent application Ser. No. 09/658,332 filed on Sep. 8, 2000, now abandoned, which application in turn claims priority under 35 U.S.C. §119 to U.S. Provisional Application No. 60/152,920, filed Sep. 8, 1999. The disclosures of all of these applications are hereby incorporated by reference in their entireties.

BACKGROUND OF THE INVENTION

1. Field of the Invention

The invention relates generally to the field of computer implemented account tracking, processing, and management. The techniques are applicable to diverse fields.

2. Description of the Related Art

With the advent of the Internet, a wide variety of computer implemented methods of tracking customer activity, fulfilling customer orders, and the like have been implemented or proposed. In some cases, these methods include the creation of user specific accounts which include various types of information about the customer, and which help define, at least in part, the nature of a system user's interaction with the system.

One specific area which involves extensive account maintenance and monitoring is the securities trading environment. In these systems, an example of which is provided in FIG. 1, client investors of an investment advisor firm maintain accounts for trading corporate securities.

FIG. 1, which consists of 1A, 1B, and 1C, illustrates present technology for the infrastructure of an example financial management system which may be utilized by an investment advisory firm. At the Investment Advisor (IA) site 102, a local area network (LAN) 104 comprised of servers 106, workstations 108, and telecommunication and network connection equipment 110 is installed. The servers 106 allow the investment advisor firm to store and retrieve data for internal and external purposes. The workstations 108 provide the investment advisor firm with terminals from which to execute programs and enable the end-user to connect to outside data sources such as remote servers 112 through the Internet/Network 114. The telecommunication and network connection equipment 110 allows the investment advisor firm to connect to outside sources of information and services such as custodian banks, analysis firms, clearing houses, and securities broker/dealers. Under this configuration, the investment advisor firm executes application programs from several different locations, servers and/or workstations. It is the responsibility of the investment advisor firm to install and maintain the hardware and software for all equipment and programs at the investment advisor site 102.

FIG. 2 illustrates how the IA business presently consists of 12 core processes. The exact method each IA uses to complete these processes varies from shop to shop. As a result the actual number of steps for performing each one of the 12 processes can vary from shop to shop. The 12 core processes required for the IA are the very basics and essentials of its business. To implement each of these 12 processes requires proper procedures and passing of information from each process to the next.

To open an account 202, all relevant information about the client and his/her account is recorded. This information will include among other data, name, addresses, account type, contact information, compliance restrictions, billing information, custodian bank details, legal information and broker/dealer (B/D) requirements in addition to security and cash holdings. Different elements of the client account information will be used in each of the 12 processes. The relevant information for a user is presently not available in an efficient manner.

When an new account is opened for a client, the IA will record all of the new client holdings 204. These can include equity and/or fixed income securities, mutual fund shares and cash. As each new trade is executed for a client, the IA may record the result in the client's account.

Next, the IA should receive a record of the client's holdings at the custodian 206 and reconcile. Securities and cash owned by each client are held by a custodian bank and not by the IA. The custodian bank maintains records for each client showing these holdings. The records of the IA preferably match the records of the custodian bank for each client. Whenever a new account is opened for a new client, there may be a delay in receiving the information from the custodian bank and recording the client's initial holdings. During this delay, the client's holdings may change. Moneys can be added and/or withdrawn and securities traded. After an account is opened, the correct 207 step takes place. The IA must reconcile its client account information with the custodian bank's information on a regular basis. If the IA had a different record of holdings than the record of the custodian 206, then the IA will see the inconsistency and notify the custodian 208. Account reconciliation can be done daily, weekly or monthly. This will depend upon how often the custodian bank makes the client's data available and how much time the IA has available to reconcile accounts. Presently the IA does not have information regarding a client's holdings at the custodian bank on a real time basis. The IA therefore does not know exactly what funds are available to be invested and may be recording inaccurately the securities in the client's account. Any systems that may potentially allow for a real time reconciliation require tremendous resources for the IA and the custodian to be able to communicate and make such information available to each other.

At the end of the month (E.O.M.) or the end of the quarter (E.O.Q.), the IA runs special routines. If it is the end of the month or the end of the quarter, the E.O.M. OR E.O.Q. step 224 will perform certain operations. If it is not the end of the month or end of the quarter, the next step will be performed. At the E.O.M. the IA runs performance information for each client's account, obtains equity security split and dividend information, updates fixed income securities payment information, reconciles client account information with the custodian bank records, etc. At the E.O.Q. the IA performs the E.O.M. routines plus run the client billing. IAs typically bill clients on a quarterly system on the basis of average assets under management during the quarter. The billing process includes reconciling all client account information with the custodian bank's records. The IA should determine if there have been any additions and/or withdrawals in the accounts during the quarter and if so make appropriate billing adjustments from the day the adjustment occurred to the end of the quarter. The IA should prepare and distribute necessary client account statements and reports.

A portfolio manager (PM) performs trade identification 210. A PM will use various analytic tools to determine what trade he/she wants to make. The analytical decision to buy or sell is based on extensive research by the PM. The PM researches and studies the thousands of different companies and investment vehicles that are available. The PM will need to analyze company specific data to make the investment decision.

The PM's will also make investment decisions based on the investment objectives that the client agreed to with the PM when the account was opened.

The PM will next review holdings positions for any buy/sell 212. Once a PM decides on a trade he/she wants to execute for his/her clients, he/she must refer back to the client account information for each client to determine which client accounts can participate in the trade, e.g. sufficient cash or any restrictions preventing the trade for the client account. The PM must determine which accounts to include in the trade taking into consideration account restrictions. The process of referring to account information and parsing it to see how many client accounts can do the trade remains a largely manual process. Even if the information is already in some electronic format, the PM has to refer back to each account, identify any constraints and compare these constraints against the trade details to determine the clients which are eligible to participate. Ideally, the trade details would automatically be compared against a database holding the client account information to identify clients which are not able to participate. Whenever the PM decides to place an order, the PM must pass the order to the trader for execution.

Under the step of pass orders to trader for execution 214, the PM creates a formal request for the trader. This formal request to execute an order passes all relevant trade details and all regulatory requirements. The trader should be able to execute and act upon the PM's request at anytime during trading hours.

Under the step of execute order until complete 216, the trader then must decide how to execute this trade, either as a single order or combine this order with another identical order and create a block order. One factor the trader may identify in constructing the trade is the particular designated B/D requirements for each client. A client may specify that all of its trades or some percentage be directed to a specific B/D.

Once the trader has determined how many trades go to each B/D, he/she will either call a B/D or use an online system for a particular B/D to place the trade. The online system may require the trader to re-key the trade request into the B/D's proprietary system or perform some "cut and paste" operation to move the data electronically into the online system. The trader needs to be able to transmit order requests correctly to the B/D in each B/D's format for execution. The trader preferably should be able to simultaneously manage several orders with multiple B/Ds.

The trade correct 218 then has the trader verify that the order was correctly executed by the B/D. The order should reflect the correct order parameters such as buy or sell, quantity, price or market request (e.g. at the market or limit). The correct trade with broker &/or custodian 220 requires the trader to record the time and report information from the B/D upon notification from the B/D. If the order is not correct, it is the responsibility of the trader to notify the B/D of any errors and correct the order. The trader passes the trade to the settlement area in order to settle the trade.

To settle trade 222, a portfolio assistant will then take the trade details and confirm the information with the B/D and the custodian. Any information which does not match needs to be reconciled until the order matches. The portfolio assistant will have to provide settlement details for the security and cash payments. Each client account can have multiple clearing instructions depending upon the security being sold/purchased. The correct settlement instructions should be reflected for each client participating in the trade. The settlement instructions should be provided by the IA to the custodian bank and the B/D. The custodian bank and the B/D should agree on the settlement of the trade. All regulatory requirements should be satisfied when settling a trade. DTC eligible trades should be affirmed i.e. approved, for the trade to settle.

Once all the trades have settled, the information should be posted into all the relevant client accounts.

In addition, a user will perform E.O.D/E.O.T. routines 222. At the end of the day (E.O.D.) or end of the trade (E.O.T.), the trader will generate a report to comply with all regulatory requirements. The trader has to notify the PM regarding the completion of the trade, which includes the price of the trade.

Other environments have similar account tracking requirements. In the retail sales environment, for example, a set of core processes can be defined that are fundamental parts of retail sales. In these and other environments, existing art today is cumbersome and addresses only segments of identified core processes. It consists of components that separately handle distinct tasks. No one program or set of programs completely addresses and handles core processes of an enterprise from start to finish. The solutions today address each process and provide a solution as if it was an isolated body of information not connected to the next. The connections between programs are not seamless or do not exist at all. For the most part the data has to be manually re-entered upon the commencement of the next process.

Thus, the transition from one of the core processes to another identifies a break in the flow that requires information to be moved from a process to the next process. The data may be moved (1) manually to the next process by re-keying the information into the system to be used in the next process, (2) by a "cut & paste" approach in which data will be electronically "cut" from one system and "pasted" into the next system by the user, or (3) by electronically moving the information by manually invoking a program that will take as input a file and then pass the information on to the next process.

Regardless of the approach, each time a system user has to move to the next process there is a break in the flow of information. This can translate into one piece of information, such as the client account number, being keyed into different systems as the IA moves from one process to the next. This is known as a "portage". Each portage or break and re-entry of data represents an possible risk of error and an inefficiency because it is an added step in running the business as the user moves from each process to the next.

SUMMARY OF THE INVENTION

In one embodiment, the present invention comprises an information management system including a collection of data that can be changed or viewed by system users. The system also includes a user profile database that stores system related information. User identification information is stored so that a user may gain access to the system and so the system knows the access rights of the user. In other words, there are certain displays and/or modifications that are allowed dependent on the user that is using the system. In addition, there is a rules database, which stores information that guides the system how to react in response to a user modification to information in the financial database. User profiles of other system users will be updated when there is a system response to a user modification.

In one advantageous embodiment, the system can be web hosted. The system users can interface with the system using a web browser such as Microsoft Explorer or Netscape Navigator.

In another embodiment, computer implemented tasks such as opening accounts, recording client information, and executing business transactions are performed. In addition, when one or more of these tasks is completed, one or more user profiles are updated.

Another embodiment is an electronic method of executing a trade in a system configured to manage a plurality of client accounts. The method includes: querying a user profile database to determine access rights for a user; receiving trade instructions from the user to trade securities for one or more of the client accounts; comparing the trade instructions to a rule set to determine whether the trade is a valid trade; identifying one or more brokers to execute the trade; determining whether sufficient holdings for the trade are available at the one or more custodian banks for the trade; and electronically sending the trade to one or more broker/dealers for execution if sufficient holdings for the trade were determined.

Yet another embodiment is an Internet based investment account management system configured to send trade instructions for securities. This embodiment of the system includes: a user profile database comprising user profiles for portfolio managers and traders, wherein said user profiles comprise access rights specifying a subset of client financial information available to the portfolio managers and traders; a data link to a custodian bank which provides online access to records of client holdings at the bank; a business logic manager configured to read instructions from a database module, wherein the instructions comprise custom logic routines for each trader, and the logic routines define whether the trader is authorized to execute a trade and whether sufficient holdings are available at the custodian bank for the trade; and a data exchange link with a broker/dealer system, wherein data representing the trade to be executed and any limitations on the trade are formatted by the system in accordance with a user profile associated with each broker/dealer system and sent to the broker/dealer system for execution.

BRIEF DESCRIPTION OF THE DRAWINGS

FIGS. 5, 6, and 7 illustrate screen displays of a trader viewing trade activity using the system in FIG. 3.

FIG. 9, which comprises FIGS. 9A, 9B, and 9C, illustrates the components of of the server system in FIG. 8.

FIG. 10, which comprises

DETAILED DESCRIPTION OF THE PREFERRED EMBODIMENT

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 3:
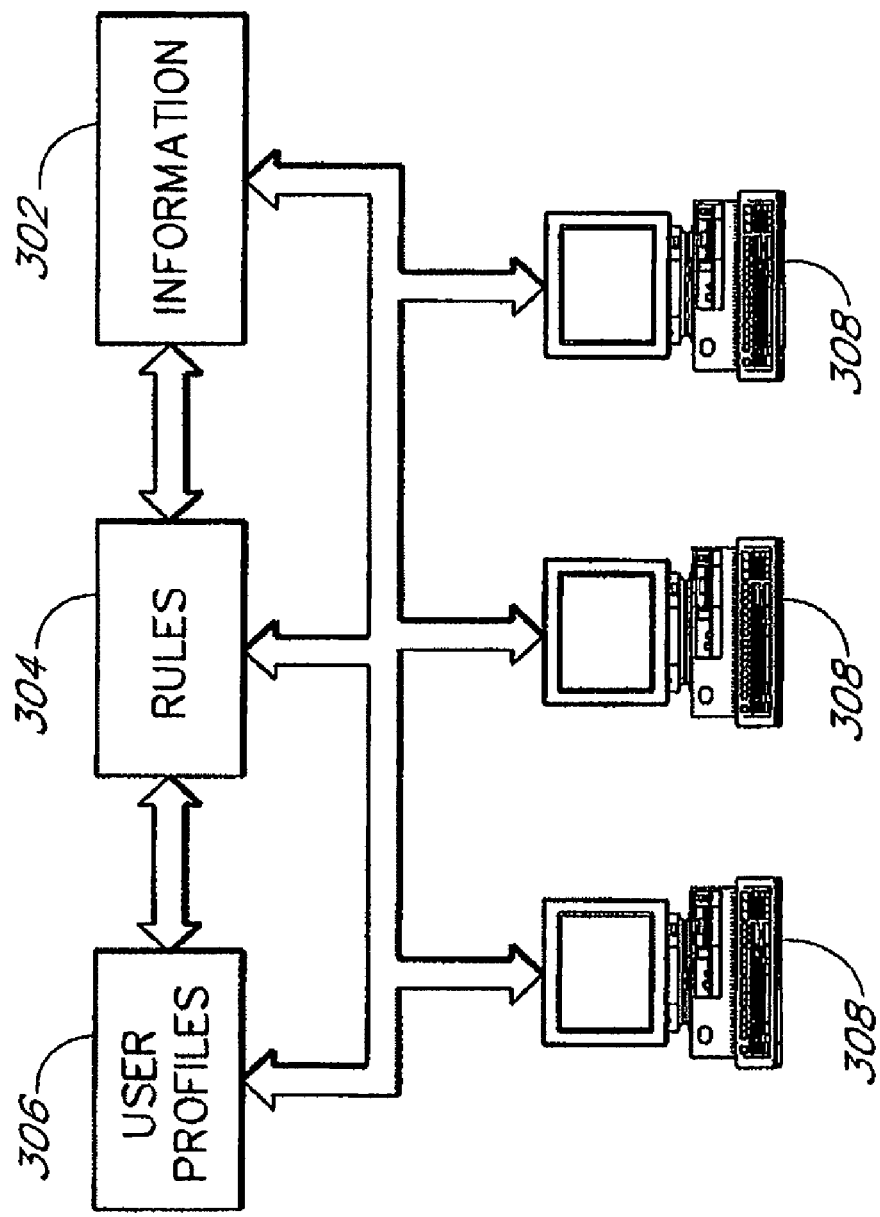
FIG. 3 is a block diagram of a system for updating financial information and user profiles of system users.

FIG. 3 illustrates a system for managing and updating account information. This system is advantageously implemented in a networked environment, as will be explained in additional detail below. Fundamentally, an account management system in accordance with this embodiment of the invention may be structured as a database of account information which is selectively available to users for alteration and viewing. The alteration and viewing is performed in accordance with other stored information defining what account information different users are allowed to alter or view, as well as defining system response to user input such as account information updates, additions, or other alterations. Such a system has advantageous application to many fields. In one embodiment, the users of the system are those involved in the management of third party investments, e.g. portfolio managers, traders, and other members of an investment advisor firm, as well as their external partners such as brokers, banks, etc. This embodiment is described in additional detail with reference to FIGS. 3-9. In another embodiment, the system users are point-of-sale clerks, store managers, and vendors in a retail sales environment. This embodiment is described in additional detail with reference to FIGS. 10 and 11.

In the investment account management embodiment, and as depicted in FIG. 3, the first component of the system is a database of financial information 302. This collection of information includes data concerning the client's holdings and the types of securities the client holds in his or her account. In addition, the database may include information about the client's decisions to participate or not participate in certain trades. For instance, if the client does not wish to have more than 50% of his or her holdings consisting of equity stocks, that information may be recorded in the database. Also stored in the database of financial information 302 is information about investor clients and their accounts. In general, all of the information regarding a client account would initially be entered into the database when the account is opened. This would include basic account details such as name, contact information, settlement instructions, cash and security positions, and additionally include more sophisticated data such as security and industry restrictions, specific B/D requirements and discretionary versus non-discretionary trading authority.

The second component depicted in FIG. 3 is a database 304 of "business rules. The business rules stored in the database 304 are tasks or operations that the system performs in response to user manipulation of the financial information data 302. The process of opening an account, for example, is defined by a series of steps which are performed during that process. The steps are translated into logic components and dialogs that allow the user to input data and/or respond to a question in order to move to the next logical step and complete the account opening process. Thus, when the user enters data in a dialog or when the user clicks a dialog button, such as "Next," a series of steps are invoked. These actions may include verifying that the data entered is in the correct format, i.e. no "dirty-data", and executing a series of programs that will store/retrieve and/or perform some algorithm with the data that the user has on his/her screen or other data in the database of financial information 302. These operations are defined by the business rules in the database 304.

Another component of the system of FIG. 3 is a collection of user profiles 306. Each user of the system is assigned a user profile containing information defining the functions that the user can perform and the display the user can view. The appropriate user profile is retrieved when the user logs onto the system. This prevents the user from entering unauthorized requests and ensures that the user can view that information necessary to effectively perform their duties. For instance, the user profile of a portfolio manager at an investment advisor firm may allow the portfolio manager to view and change the security trading restrictions of a client, whereas the user profile of a banker at a custodian bank might not allow the banker to view this data or make such a change.

Figure 8:
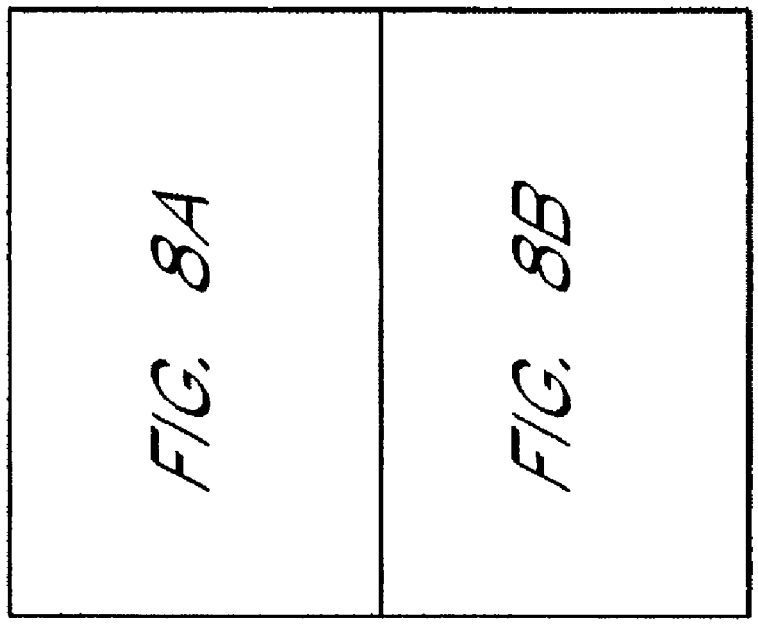
FIG. 8, which comprises

Although three separate databases are illustrated, it will be appreciated by those of skill in the art that all of the information, including financial information, rules, and user profiles may be combined into one database, as is shown for example, in FIG. 8.

In accordance with one aspect of the invention, user profiles 306 may be updated automatically and transparently when there is a change to the information 302 in the financial database. For example, the user profile of a selected portfolio manager will define what client accounts that portfolio manager can view. As any given portfolio manager will manage only a subset of the investment advisor firm clients, the user profile will specify those particular accounts that portfolio manager is responsible for, allowing viewing and processing of those accounts only. If an assistant adds a new client and the associated information to the financial database 302, the rules 304 specify that the user profile of the appropriate portfolio manager be automatically and transparently updated to allow the correct portfolio manager access to the client information to view and process the client account.

Figure 4:
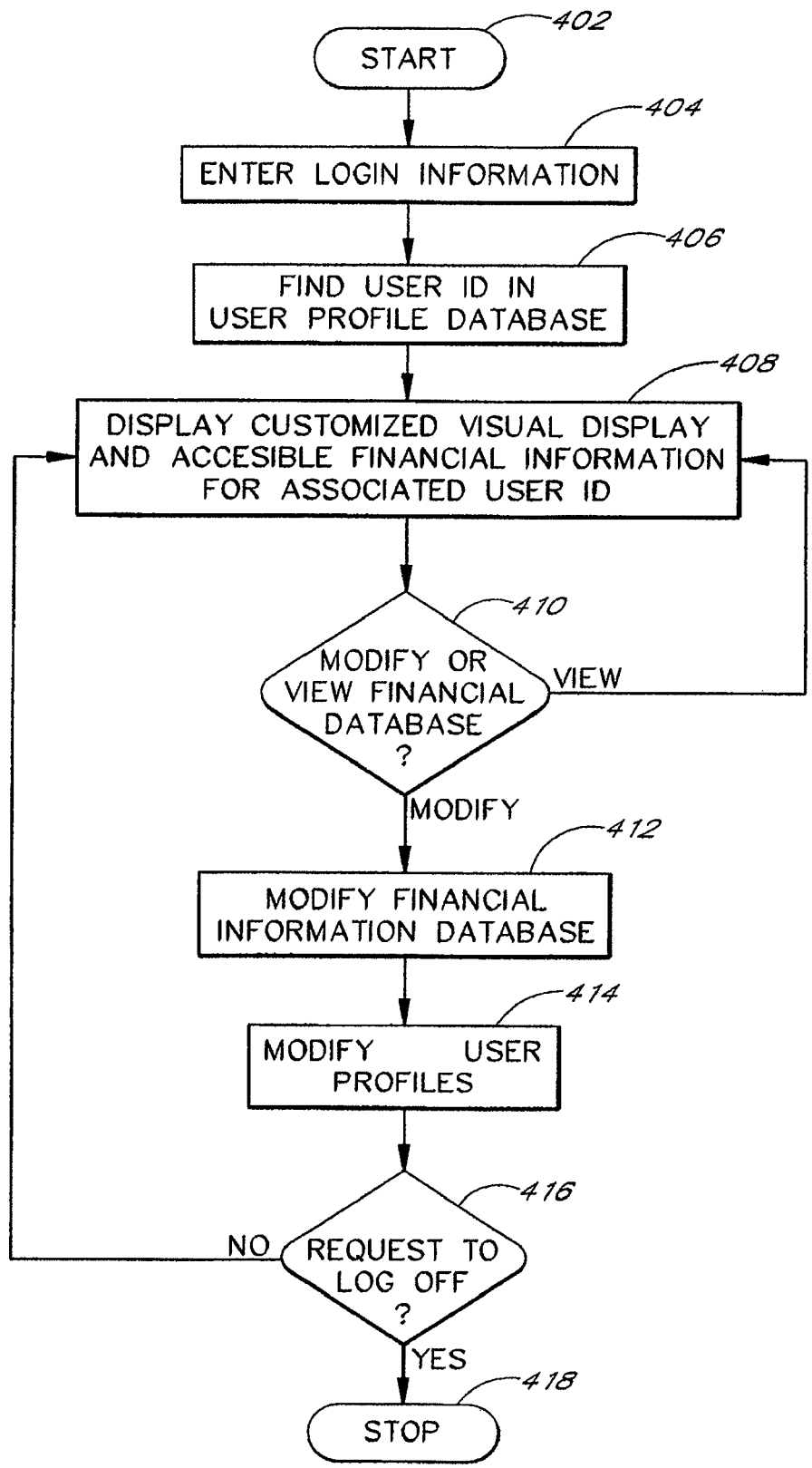
FIG. 4 is a flow chart of a transaction processing method in accordance with one embodiment of the invention.

FIG. 4 illustrates a process that the system embodiment of FIG. 3 may implement in the modification and viewing of financial information. To start 402, a user enters his or her log-in information 404 in order to access the system. Before the system allows entry, an index may be used to match the user with a user id in the user profile database. After a match is found, the user is allowed to view information according to a customized display 408 set by the user profile. As one example, a user id might be JD100TDHCM. When this user connects to the system, the system will retrieve user session parameters such as "Trader, Harold Corporate Management Systems, Dialogs—8, 10, 22, 23, 44, Screen settings—5, 11, 23, 29, 40." These parameters, defined by the user profile, will identify the entitlements that this trader has to the system and to the information in the database 302.

The user can view information in the database or can attempt to modify 410 the information in the database. If the user wishes to modify 412, the modification must be in accordance with the rules, or the system will reject the modification. As discussed above, after the modification at block 414, one or more user profiles may be updated in response to the modification. Then the user may continue view until another modification or log-off is requested 416. After log off, the process stops at block 418.

In some embodiments of the invention, modifications to the database 302 and the user profiles 306 are made in real time, and all users logged onto the system are notified of the changes. This type of real time update to a user profile is illustrated by the screen displays of FIGS. 5, 6, and 7.

Figure 5:
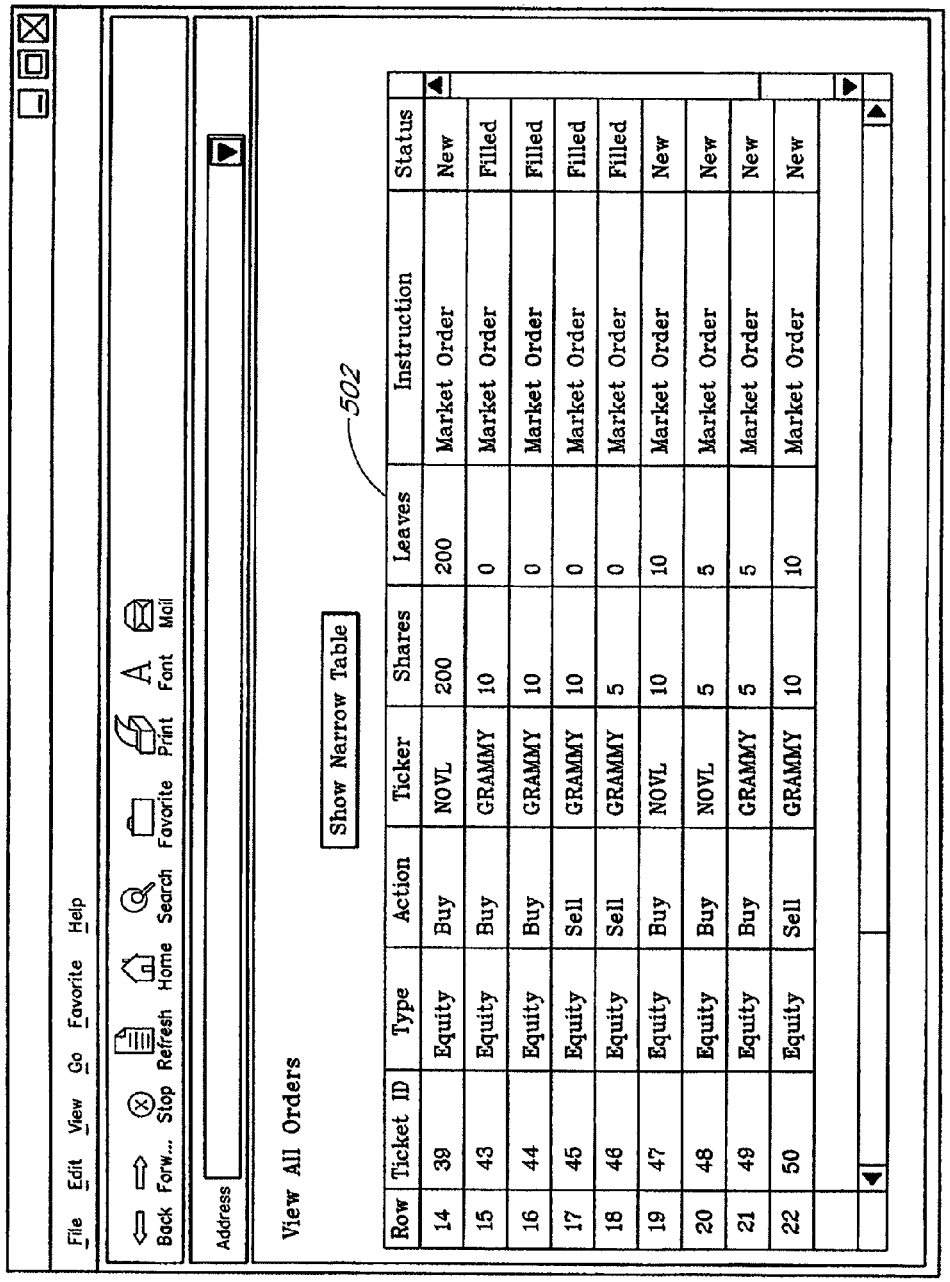

FIG. 5 shows a trader's screen 502 viewing all equity trade orders in the system. In this example, the trader is using a display setting that causes the display to be refreshed when something such as a trade order has changed. In this example, the screen does not change on a specific time interval but rather when a trade has changed or new trade has entered the system. In FIG. 6, the system notifies the trader that a new security type, "option" has been defined in the system, by, for example, the investment manager of the investment advisory firm and that there is a new trade order that has entered the system. With a dialog box 602, the system notifies the trader that the trader's user profile has been modified 602. In FIG. 7, the user profile for this trader has been modified to allow the display of option trades 704.

Figure 10A:
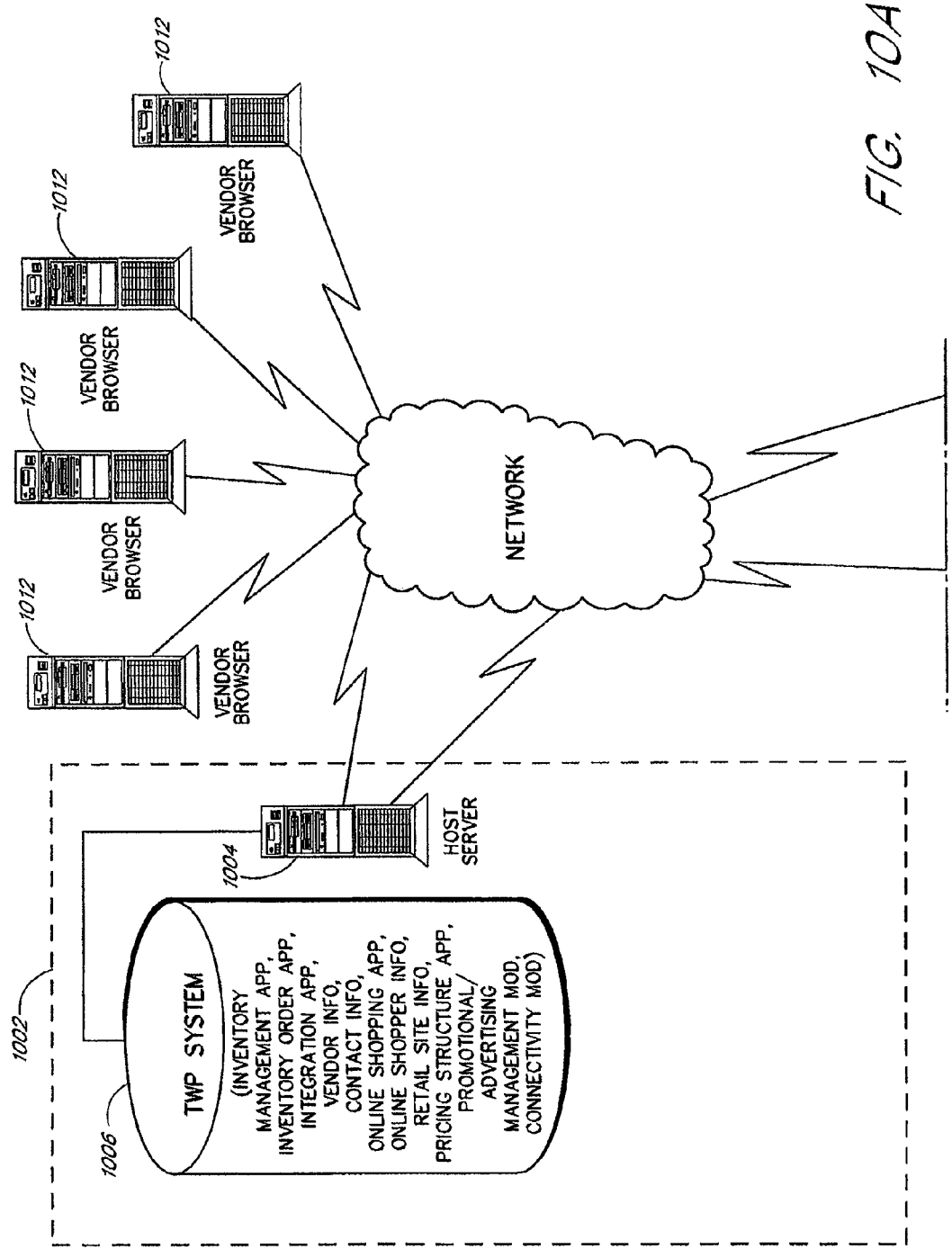
FIGS. 10A and 10B, is a block diagram of a retail sales system in accordance with one embodiment of the invention.
Figure 10B:
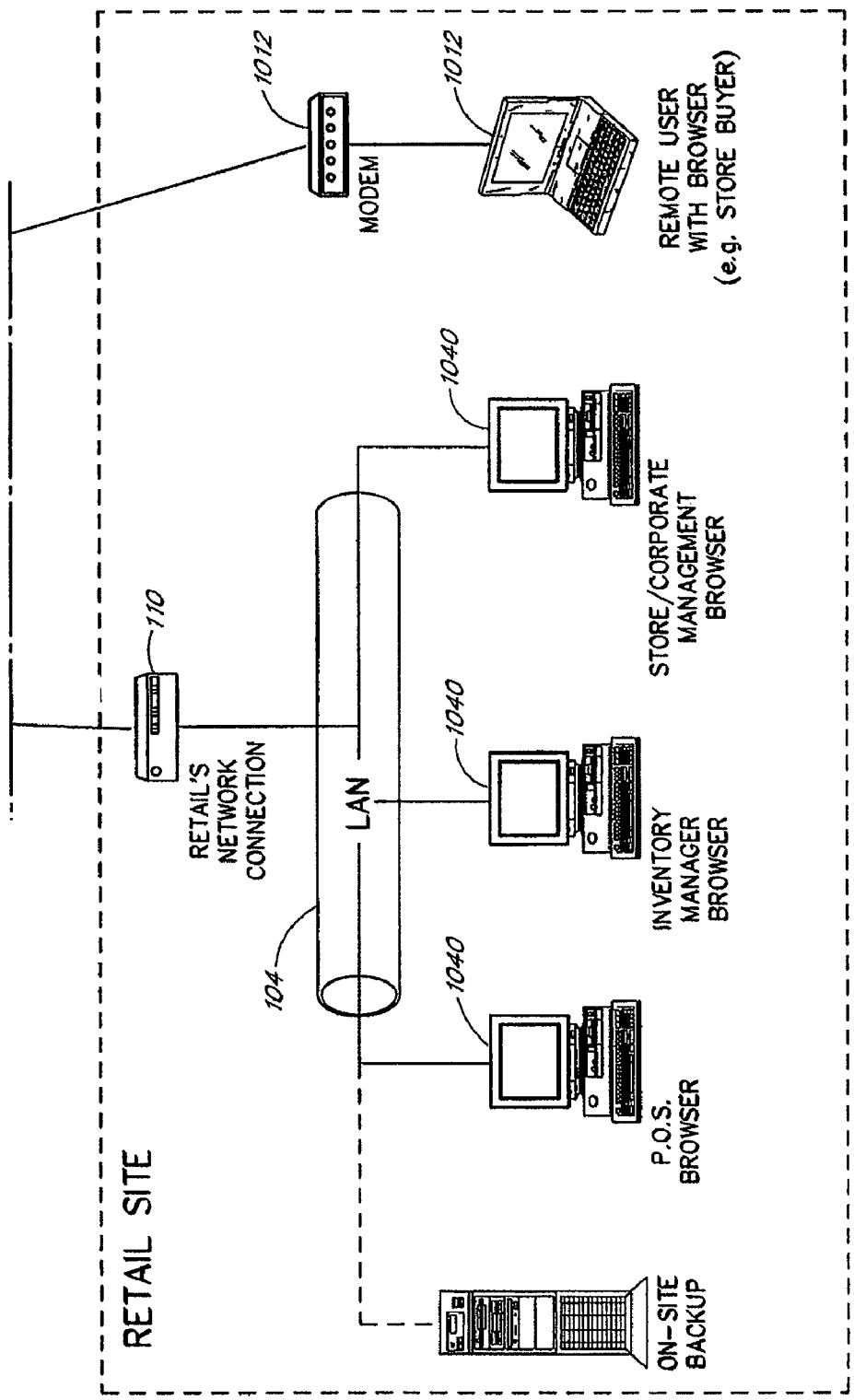
Figures 11, 11A:
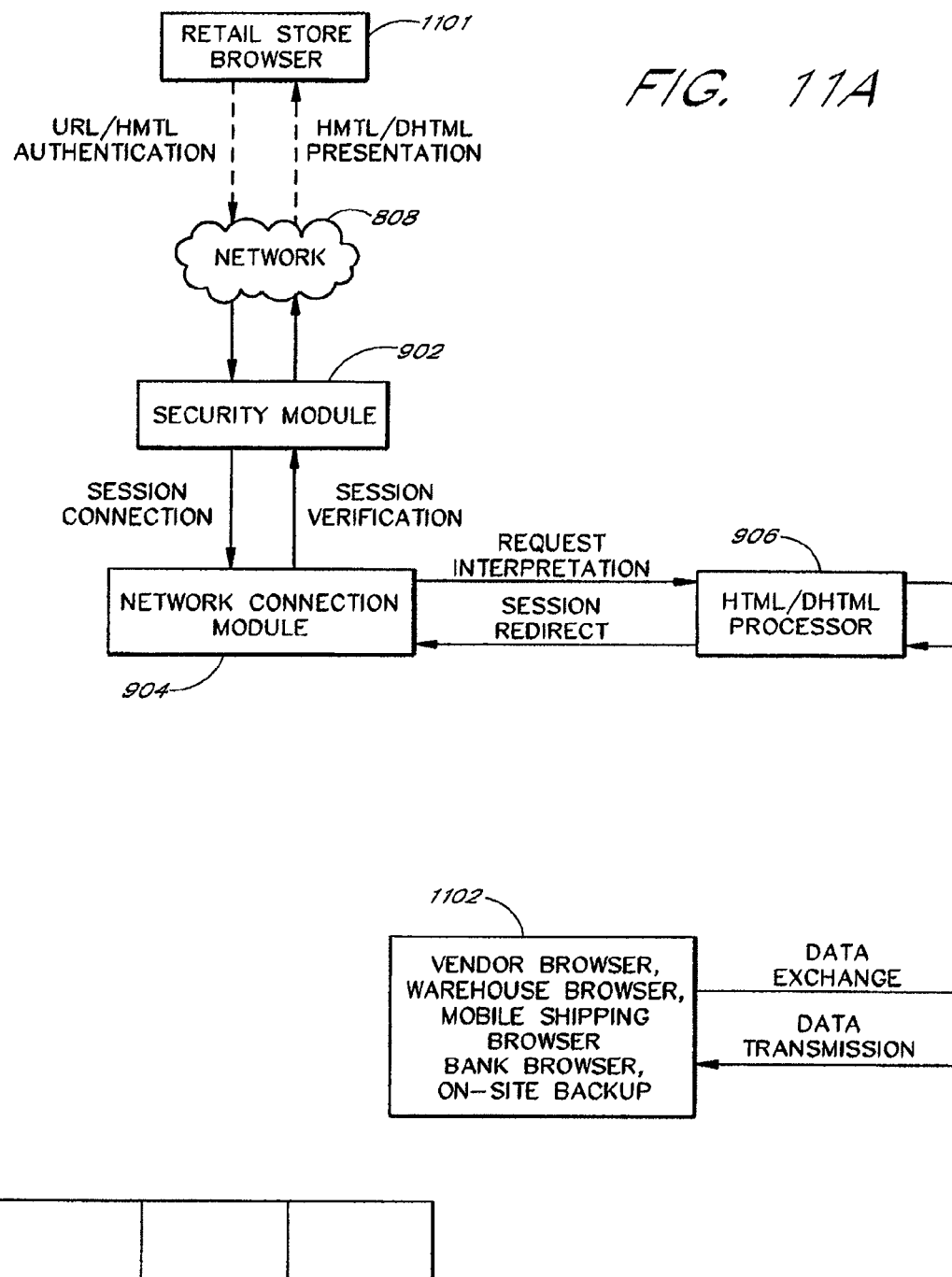
FIG. 11, which comprises
FIGS. 11A, 11B, and 11C, illustrates the components of the server system of FIG. 10.
Figure 11B:
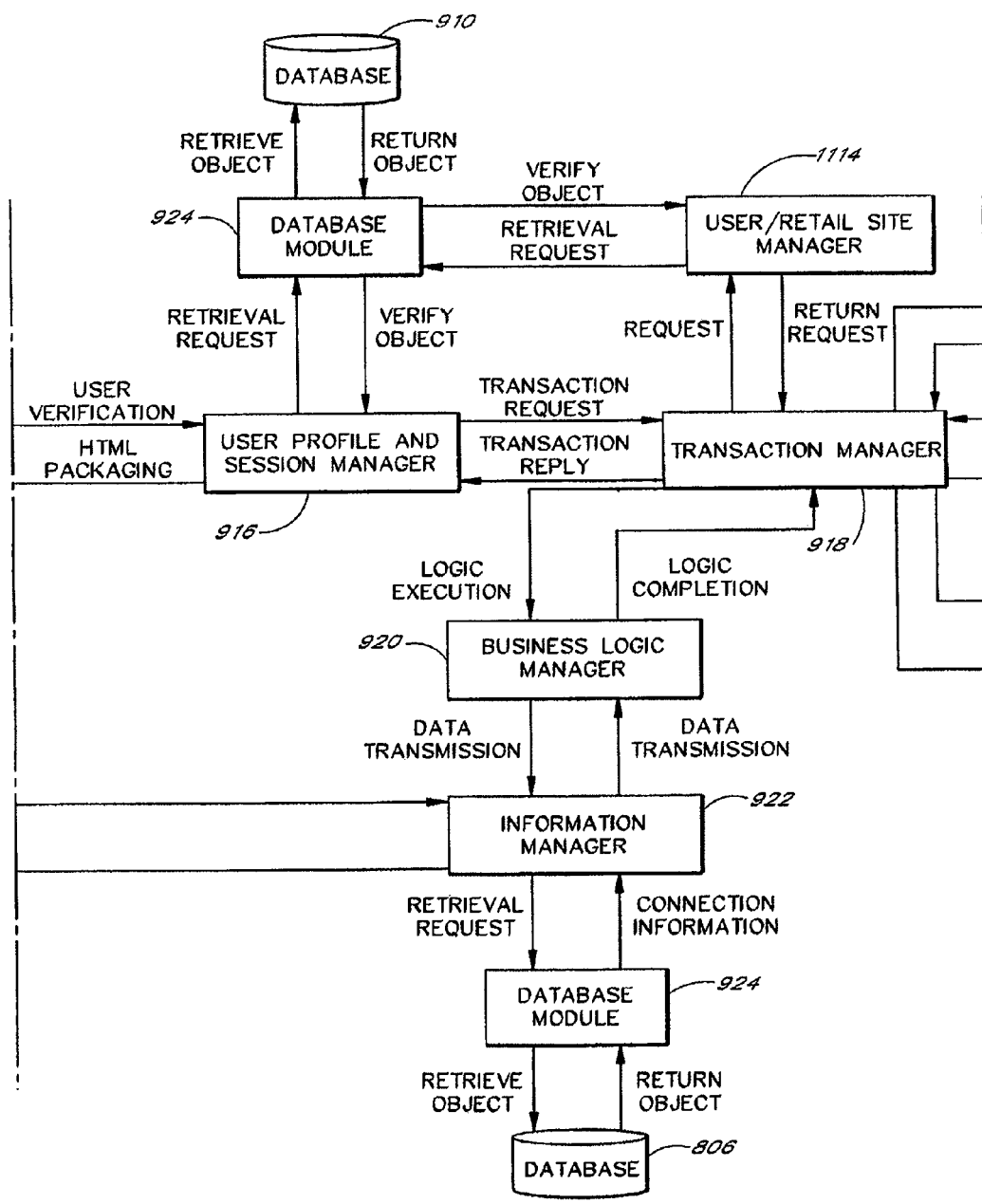
Figure 11C:
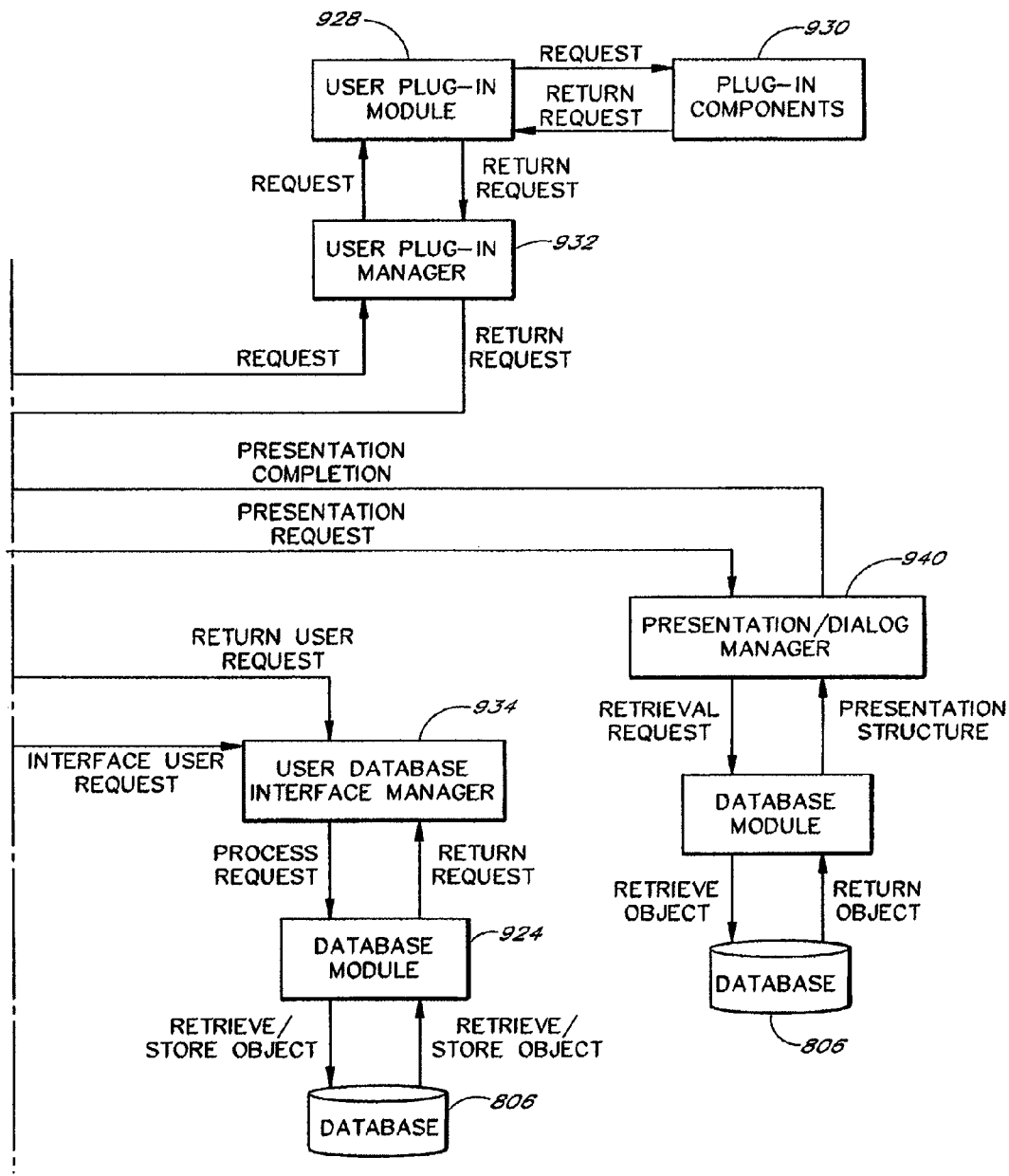

Turning now to FIGS. 8-11, specific applications of the system architecture of FIG. 3 are shown. In FIGS. 8 and 9, the system in applied to the investment advisor environment. In FIGS. 10 and 11, the system is applied to the retail sales environment.

Figure 8A:
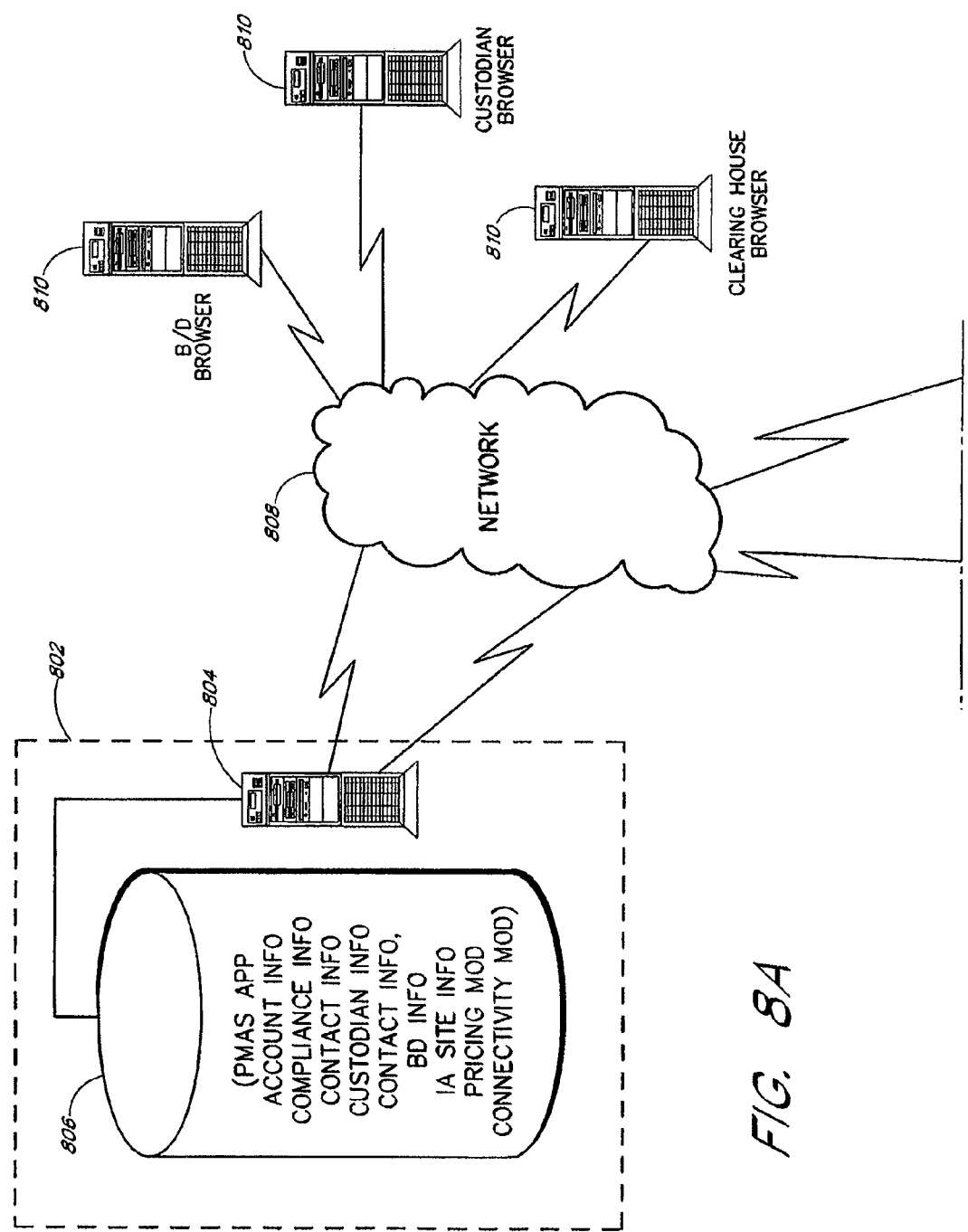
FIGS. 8A and 8B, is a block diagram of a financial system in accordance with one embodiment of the invention.
Figure 8B:
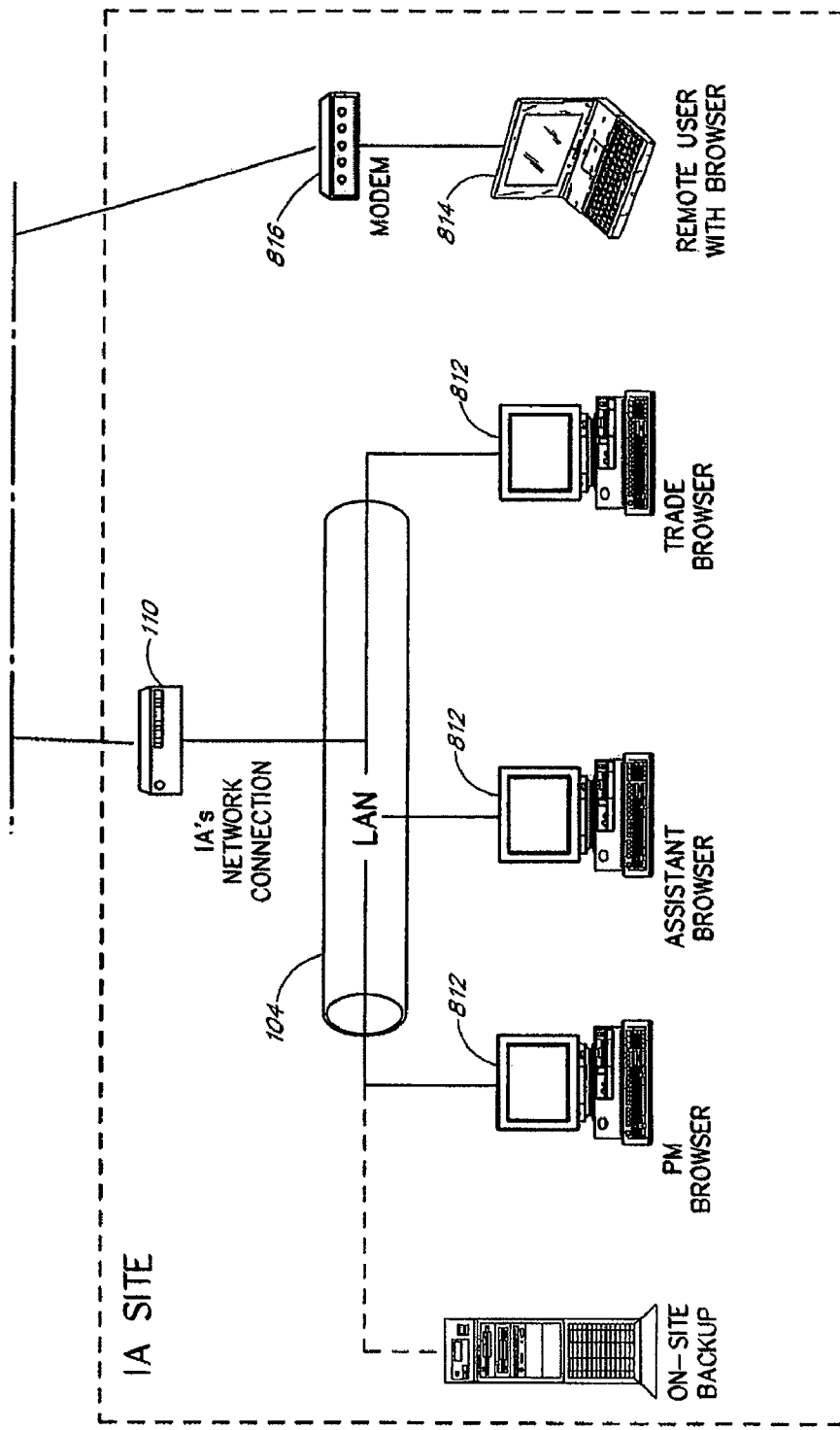

FIG. 8, which consists of FIGS. 8A and 8B, illustrates a web hosted implementation of the system in FIG. 3. The system 802 advantageously comprises an Internet/Intranet application running on a host server 804. The server 804 is in communication with a database 806 which incorporates all of the information databases 302, 304, 306 that are described above with reference to FIG. 3. The application and the information in the database is accessible at a network address (e.g. www.site.com) to system users that have a PC with Internet access and Internet browser in a manner well known in the art.

In this embodiment, the database 806 would be maintained on servers 804 that would not be located at the investment advisor firm. The server 804 would receive information from the custodian banks and B/Ds that the investment advisor has business relationships with. This data would be accessible by the investment advisor firm on local computers 812 via an Internet/Intranet connection. The system 802 eliminates the need for the investment advisor to maintain any other technology infrastructure.

Furthermore, all the information required by an IA to efficiently execute trades and update all users in accordance with the latest database information would reside in one place, and be available to the entire IA firm as well as associated entities such as brokers and banks. The information and tools that any user needs to complete his/her task then could be displayed in an easily customizable format. Due to the automatic updates to the user profiles, a user's interface would display all relevant data to complete his/her task without the need to migrate data from a prior user or to the next user. This would eliminate the "portage" in the IA's workflow.

For example, portfolio managers would then be able to use this information to determine which client accounts are eligible for a particular trade. Once a trade has been identified, the PM can easily run a routine that determines who can execute the trade and if there are any limitations on how the trade must be executed.

Once the PM has identified the client accounts to be included in a trade, the trader would use his/her interface to determine how the trade can be best executed, i.e. as several trades with multiple broker/dealers or as a single block order trade. The dealing rules 304 for each client account would be readily accessible and the trader can accommodate them easily. The trader then would be able to use the on-line trading systems of any B/D without re-keying in the trade order on each B/D's proprietary system. In accordance with a user profile associated with each broker, the system would process the trade into the format required by each B/D system. The system 802 also allows the B/D to send confirmations back to the IA through the B/D's proprietary system and format. The system 802 takes the confirmation, receives the data in the unique format from each B/D and in accordance with the B/D user profile, changes the format as required by the trader and IA's settlement area.

Once trades have been confirmed by the B/D, trade and settlement details would be sent to the custodian bank and B/D based on each client account's information. All these details would be stored in the database 806, and would allow straight through processing of the trade. Once trades have settled, all client account information would automatically be updated.

Figure 1:
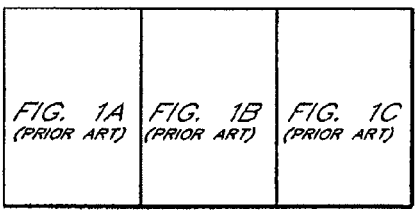
FIG. 1 illustrates the present state of the art for financial management infrastructures.
Figure 1A:
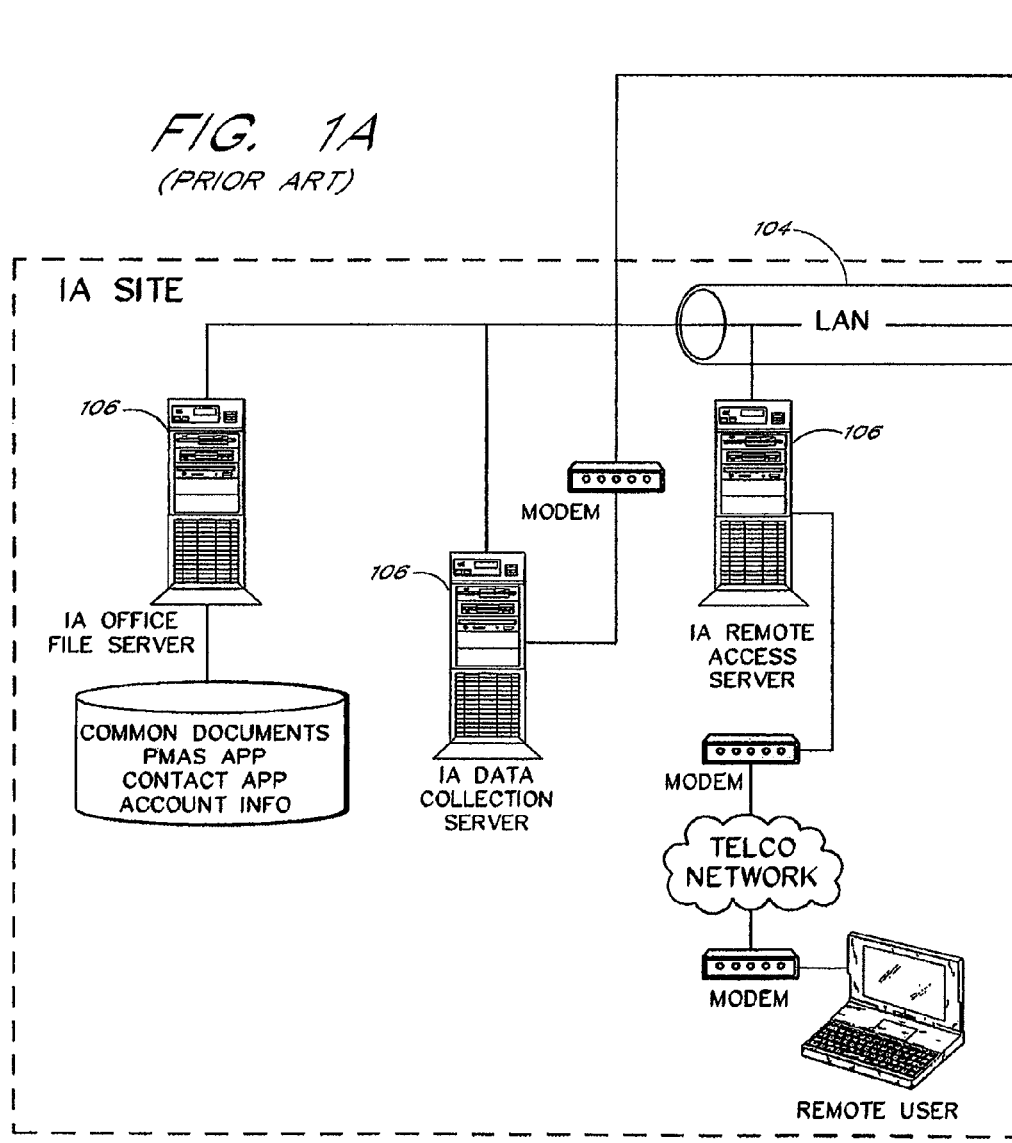
Figure 1B:
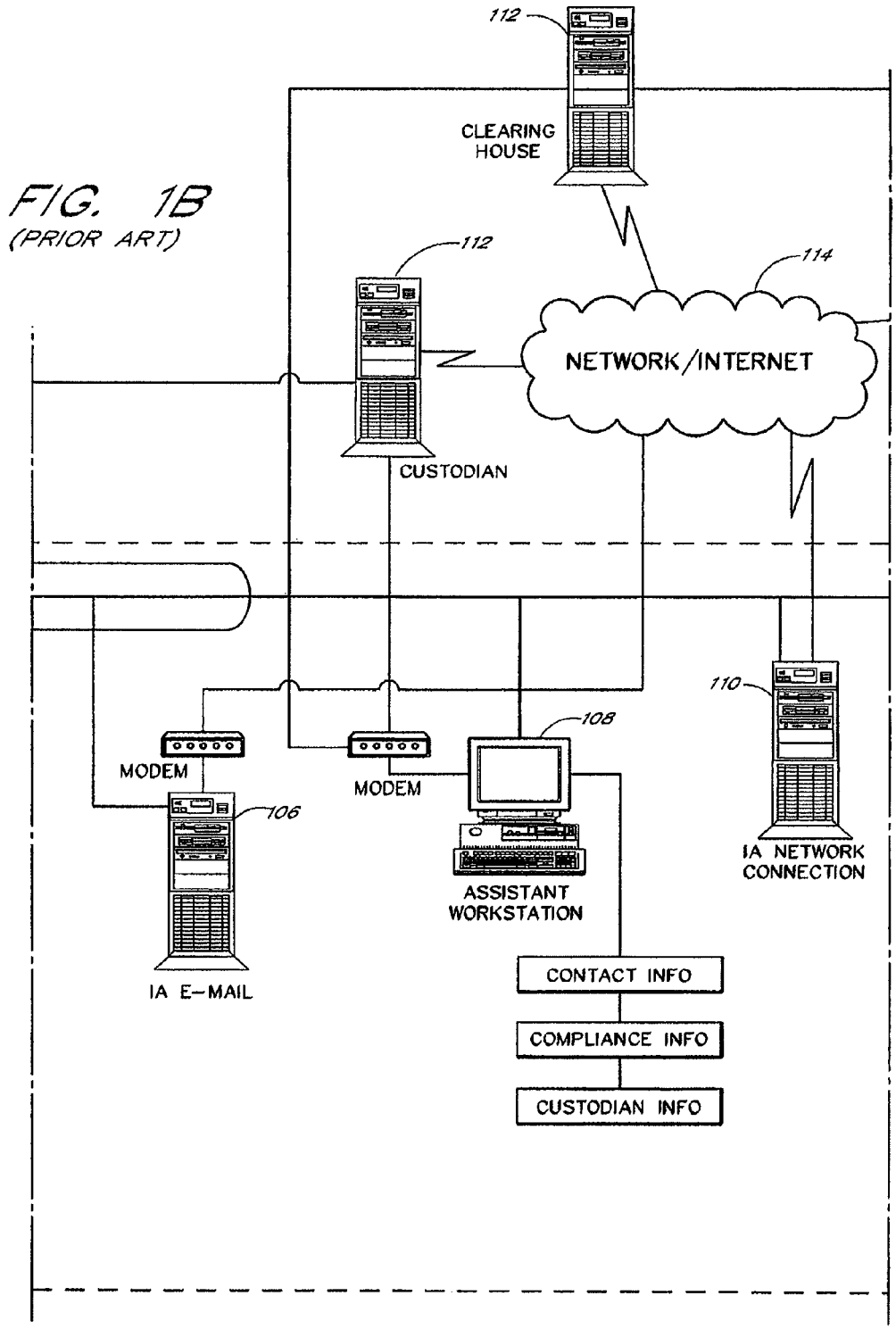
Figure 1C:
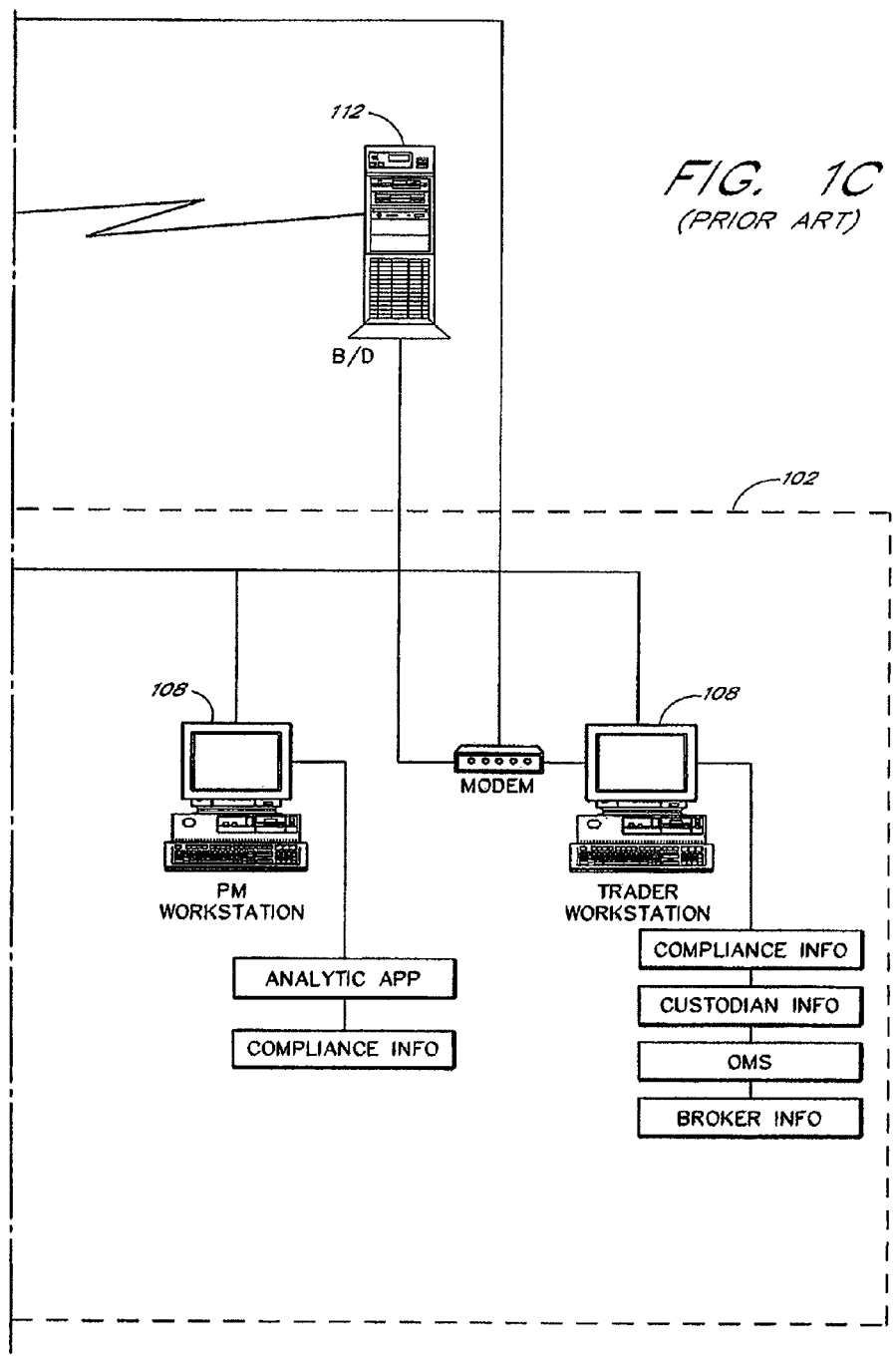
Figure 2:
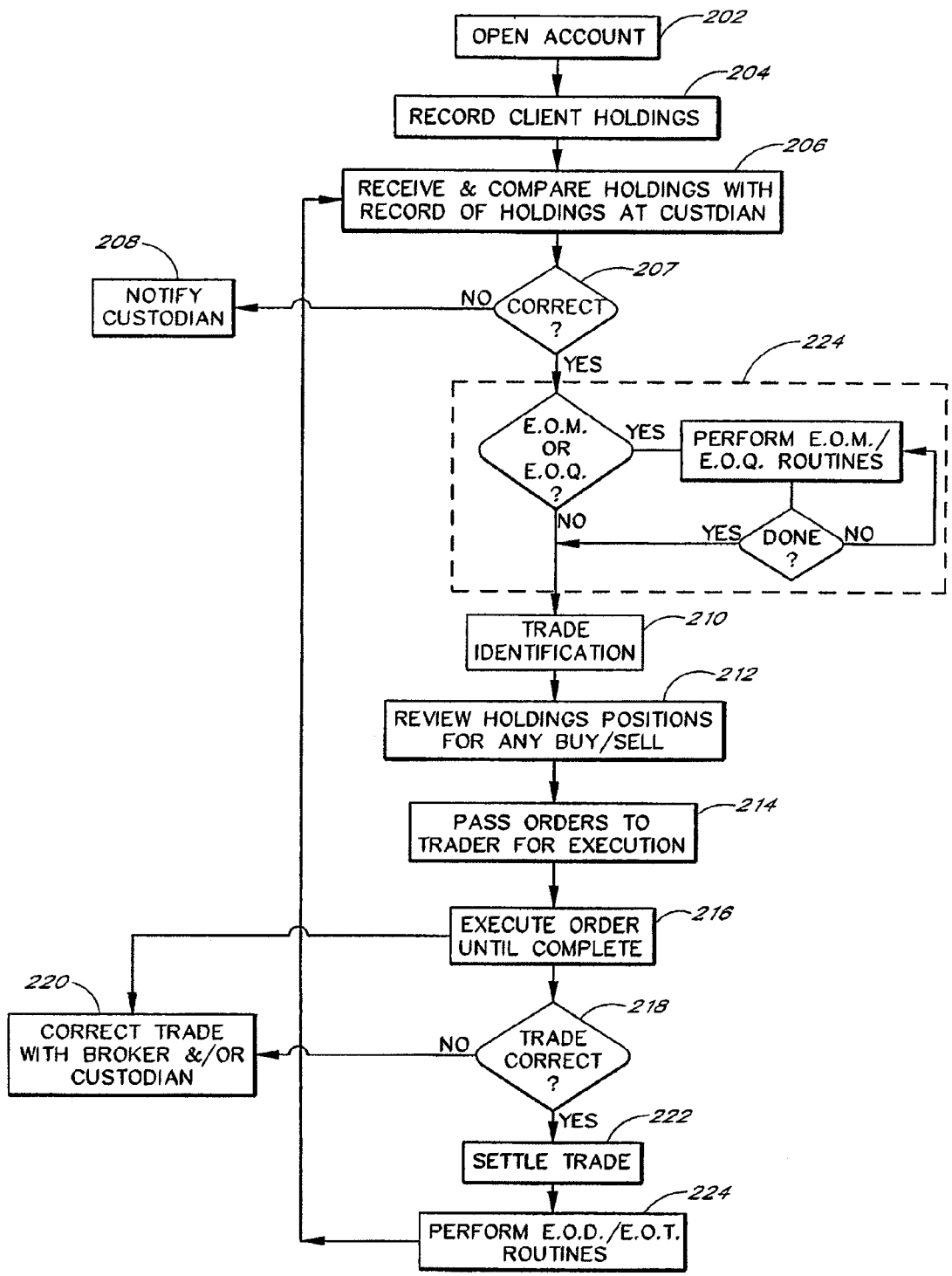
FIG. 2 illustrates the process used by the present state of the art to manage securities in the system of FIG. 1.
Figure 9B:
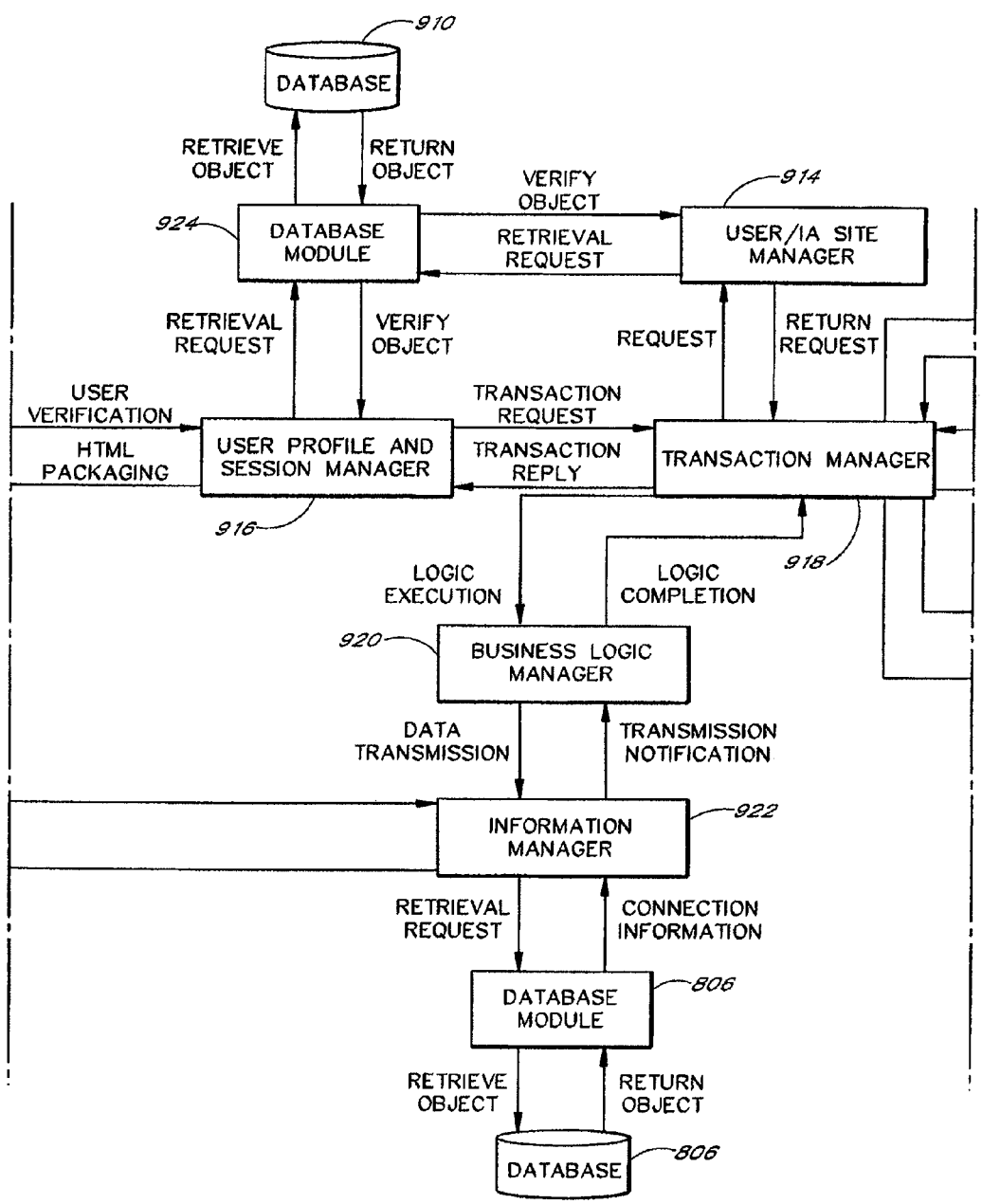
Figure 9C:
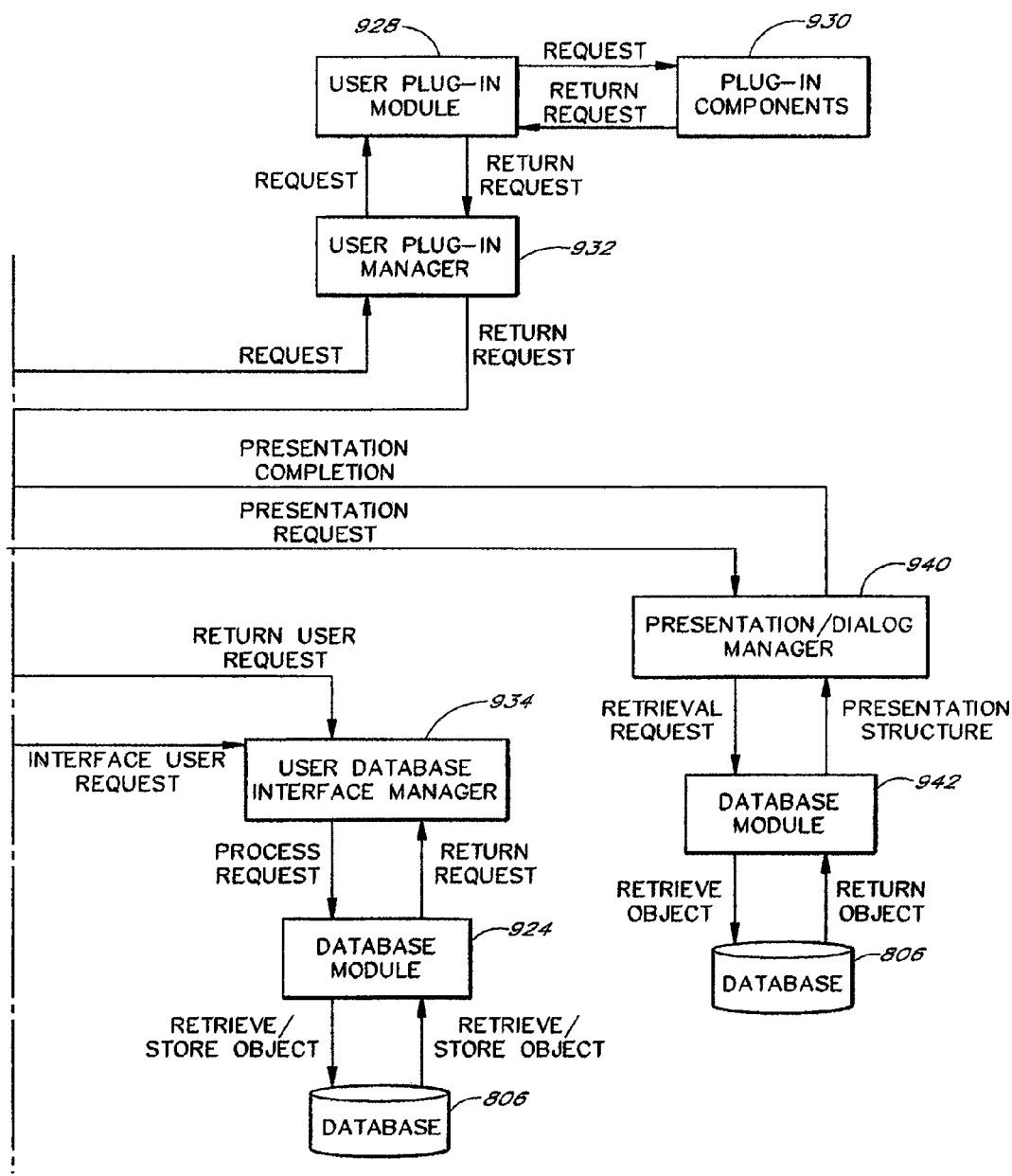

As depicted in FIG. 9, which comprises FIGS. 9A, 9B, and 9C, each of the 12 core processes illustrated in FIG. 2, the entire investment advisor business, have been broken down into specific components and into a discrete set of tasks.

The Transaction Manager 918 categorizes the user request into a business component, which is handled by the Business Logic Manager 920, and presentation layer, which is handled by the Presentation/Dialog Manager. The Transaction Manager 918 is a multitasking engine that can handle thousands of requests. Each user request is coordinated with the User Profile and Session Manager 916. The User Profile and Session Manager 916 maintains the user entitlements, the user session settings and the requests currently pending and the request currently executing. The Transaction Manager 918 issues a command to both the Business Logic Manager 920 and the Presentation/Dialog Manager 940. The requests issued to the Business Manager 920 and Presentation/Dialog Manager 940 run in parallel. Running tasks concurrently reduces execution time. Since the Transaction Manager 918 coordinates the user request with the User Profile and Session Manager, this allows the Transaction Manager 918 to process other user requests as the $1^{st}$ request is being processed by the Business Manager 920 and Presentation/Dialog Manager 940.

The system has taken the 12 core processes of the investment advisor business and places the business logic within the Business Logic Manager 920 and the screen presentations in the Presentation/Dialog Manager 940. Both the Business Logic Manager 920 and the Presentation/Dialog Manager 940 make calls to the database 806 to determine the exact algorithm to execute and the formatting of the user dialog. This allows for custom logic algorithms and custom screen settings for each investment advisor user. The User Profile and Session Manager 916 tag each request with a field that Transaction Manager 918 passes to the Business Logic Manager and the Presentation/Dialog Manager 940. This database approach allows the system 802 to maintain an infinite number of custom settings for each investment advisor shop and each investment advisor user at each shop. The User/investment advisor Site Manager 914 is the interface to add, modify and/or remove business logic and presentation/dialog settings. This approach allows the investment advisor to modify business practices without having to reengineer the system 802.

The advantages of the breaking up the business logic into the Business Logic Manager 920 and the screen presentations into the Presentation/Dialog Manager 940 is (1) there is a centralized location of business logic and screen settings, (2) new logic can be introduced into the system without reengineering the system and (3) a technician can troubleshoot an investment advisor client problem remotely.

Centralized location of the database 806 and logic allows the system to make any specific customer requests or general changes without the need to visit each customer site. The changes or modifications can be tested at the host server's location on a test database. Such changes can then can be made to the production database that is also on site at the host server's location without requiring visits to each user's site.

On a one-time basis the only software that has to be installed on the investment advisor's system is an Internet browser and security software that uniquely identifies the investment advisor browser to the host server.

An executable file and a DLL are installed at the investment advisor site only if the investment advisor user wishes to invoke the Database Interface Module 924 locally. This will allow the investment advisor to work locally with a program such as Excel or Word and a local database on the investment advisor PC. The DLL is a modification to the investment advisor's operating system that allows the PC to communicate to the system's 802 executable.

The executable and DLLs on a investment advisor's PC can be maintained and modified by the host server 804. If a new version of a DLL is required, the host server 804 can electronically send the new version to the investment advisor PC and install this software automatically on the investment advisor site. This eliminates the need for the investment advisor to maintain anything beyond a simple PC network with Internet access.

Once the user enters the system, the investment advisor can access any of modules he/she has permission to access. In one embodiment, the modules available are Trader, Maintenance/Assistant, Portfolio Manager, Billing, Reporting module, Compliance, Portfolio Management Accounting System, Fixed Income Securities, Pricing and $3^{rd}$ Party Connection.

The User Profile and Session Manager 916 determines what data the user is allowed to access as well as the format the data will be presented. This method allows each user to have a custom look and feel. In conjunction with the User/investment advisor Site Manager 914, the investment advisor can customize his/her settings, e.g. change the font and color.

The database 806 is advantageously structured such that the entire database 806 can be accessed via such key fields such as "client account number", "client name", "security name", "trade date "and" ticket number. This capability allows the end user to obtain any field of information within the database.

There is virtually no limit to the number of data fields that can be used in the system. With this database anytime an entry is made, changed or created the modification is recorded. There can be an endless number of changes that a user can make and all of the changes will be recorded.

Each recorded modification may include the time the change was made, the user that made the change and the data prior to the change.

The User Profile and Session Manager 916 resolves conflicts when two users attempt to perform the same task at the same time, such as updating a client account number. The user that submitted the update request first will be allowed to modify the field and the second user will be notified of the situation. The conflict is resolved at the User Profile and Session Manager 916 level rather then the database level. This approach removes the possibility of data corruption and the overhead associated with processing a concurrent update at the database The different modules within the system allows each person to think and function within their respective task. As data is transferred from one job function to another job function, the data is presented in the format that is expected and clearly understood within the specific job function. This can be accomplished without moving the data from one user to the next user as all the data is located in a central database.

The system will reduce the hardware requirements of each investment advisor client because the investment advisor will no longer be required to maintain servers and specialized network connectivity software and/or hardware. Th Plug-In Module 928 allows the investment advisor to connect the various systems. This allows data integration with systems, such as an Office File Server and e-mail system, network connectivity. The system 802 already has several layers of security such as the security module 902 that allow secure Internet connection. The Plug-In Module 928 allows the investment advisor to take advantage of these secure network connections. This in effect eliminates all but the LAN 104 for the investment advisor to maintain as an infrastructure. The investment advisor can access to his/her data from anywhere in the world as long as he/she has access to the Internet. All information is viewable on a real-time basis.

Turning now to the retail store (RS) environment, it will be appreciated that there may also be defined a set of core process for managing information. Product specifications, terms, availability can vary from vendor to vendor. The RS has to determine shelf life, shelf requirements, shipping requirements for both receiving the product and shipping the product to customers, cost of the product, minimum and maximum inventory levels, re-ordering requirements of the product and pricing fluctuations of the product due to market conditions.

As with the investment advisory firm system described above, in an application f the invention to the retail store environment, all information required to manage inventory and order information may reside in a database or series of databases available to the entire firm. The information and tools that any user needs to complete his/her task then could be displayed in an easily customizable format. A user's interface would display all relevant data to complete his/her task without the need to migrate data from a prior user or to the next user. The data for each user's tasks would reside in one place. This again would eliminate the "portage" in the workflow.

All of the information regarding a product initially is entered into the database when the product is ordered. This would include basic product details such as product description, vendor, vendor terms, vendor lead time to fill order, vendor minimum and maximum order, product shelf requirements, product shipping requirements, product packaging requirements, product re-order requirements, manufacturer contact and vendor return policy. All the information as to how a product must be processed would be maintained in one central location.

The store manager and the buyer would then be able to use this information to determine which products should be purchased and the quantity for the order. Once the desired products have been identified for order, the buyer can focus on filling the order, electronically notify the order details to the receiving department, accounting department and inform customers of pending orders. With the ability to pass product information to the store manager, the buyer can focus on vendor visits to see product displays, new product samples and report his/her finds to the store manager.

A retail store system 1002, implemented in a fashion similar to the system 802 depicted in FIG. 8 allows the buyer to key in the order request into the system and then electronically pass the order information to the vendor's on-line ordering system without re-keying in the order information. The system 1002 would process the order into the format required by each vendor system. The system 1002 allows the vendor to send confirmations back to the buyer through the vendor's proprietary system and format. The system 1002 takes the confirmation, receives the data in the unique format from each vendor and changes the format as required by the buyer and retail store's settlement area.

Once orders have been confirmed and shipped by the vendor, the system 1002 allows the vendor to interface with the system 1002. The interface will provide the vendor with exact packaging requirements, best fit method of the physical goods onto trucks, vans, etc., know exactly what items have been processed for shipment, when the shipment has left the vendor and the best route to the by the retail store. The system 1002 also enables the retail store to maintain one central system for product tracking, product inventory, product offering, such as point of sale and on-line sales. The Online sales system would be an integral part of the retail store's infrastructure system. As online orders are received and processed the same information regarding best shipping and packaging methods used to receive the items can also be re-used to ship the product to customers. The information about product availability and vendor lead-time to fill orders will allow the retail store to maintain minimum inventory levels Once orders have settled, i.e. payments have been received from the customer and made to the vendor, all product and account information would automatically be updated.

End of day (E.O.D) and/or end of trade (E.O.T.) routines will also be performed in order to generate reports.

FIG. 10, which comprises FIGS. 10A and 10B, illustrates a detailed web hosted implementation of the system in FIG. 3 as applied to a retail store. As is depicted in FIG. 10, retail stores are required to install and maintain workstations with a network browser 1040 and a network connection 110. The servers 1004 and 1008, connection to outside network connections 110, execution and management of application software are all maintained with the system. Specialized network connectivity software and equipment need not be installed and maintained in order to exchange data from the internal systems and applications that in and of themselves are not able to directly communicate to other networks/systems, such as a Retail Store file server.

When the user enters data in a dialog or when the user clicks a dialog button, such as "Next" a series of steps are invoked. These actions include verifying the data entered is in the correct format, i.e. no "dirty-data", executing a series of programs that will store/retrieve and/or perform some algorithm with the data that the user has on his/her screen. The Transaction Manager 918 categorizes the user request into a business component, which is handled by the Business Logic Manager 920, and presentation layer, which is handled by the Presentation/Dialog Manager 940. The Transaction Manager 918 is a multitasking engine that can handle thousands of requests. Each user request is coordinated with the User Profile and Session Manager 916. The User Profile and Session Manager maintains the user entitlements, the user session settings and the requests currently pending and the request currently executing. The Transaction Manager 918 issues a command to both the Business Logic Manager 920 and the Presentation/Dialog Manager 940. The requests issued to the Business Manager 920 and Presentation/Dialog Manager 940 run in parallel. Running tasks concurrently reduces execution time. Since the Transaction Manager 918 coordinates the user request with the User Profile and Session Manager 916, this allows the Transaction Manager 918 to process other user requests as the 1st request is being processed by the Business Manager 920 and Presentation/Dialog Manager 940.

The core processes of the RS business are implemented within the Business Logic Manager 920 and the screen presentations in the Presentation/Dialog Manager 940. Both the Business Logic Manager 920 and the Presentation/Dialog Manager 940 make calls to the database 806 to determine the exact algorithm to execute and the formatting of the user dialog. Data flow, user profile storage and automatic alteration, as well as other aspects of the user interfaces and system responses are analogous to that presented above with reference to FIGS. 3-9 and the investment advisor firm embodiment of the invention. This allows for custom logic algorithms and custom screen settings for each RS user 302 which are in turn automatically updated based on updates to account information made by other system users.

The database 806 is structured such that the entire database can be accessed via such key fields such as "product number", "product name", "product description", "order date "and" vendor". This capability allows the end user to obtain any field of information within the database.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. An electronic transaction management system configured to manage a plurality of client accounts, comprising:
    a transaction information database comprising transaction information from a plurality of clients;
    a user profile database comprising a user profile for each user of the system, wherein said user profile comprises access rights specifying one or more transactions available to the user, an algorithm to use to execute the one or more transactions, and a screen setting parameter that indicates to an Internet browser how to display the transaction information from the database to the user;
    a host server comprising a presentation manager, wherein the presentation manager is linked to the user profile database and operative to modify the user profiles so each user is presented with a customized display of account transactions when viewed in the Internet browser;
    a business logic manager configured to read instructions from a database module, wherein the instructions comprise custom transaction information for each user, and define whether the user is authorized to execute a transaction within the electronic transaction system; and
    a transaction manager configured execute transaction requests from the business logic manager according to a predetermined algorithm.

2. The electronic transaction management system of claim 1, further comprising a data exchange link with an external system, wherein data representing the transaction to be executed is formatted by the electronic transaction management system in accordance with a user profile associated with each external system and sent to the external system for execution if sufficient rights for the transaction were determined.

3. The electronic transaction management system of claim 1, wherein the transaction management system is a retail store transaction management system, and the data exchange link is a link to a vendor of the retail store.

4. The electronic transaction management system of claim 1, wherein executing transactions comprises executing securities transactions.

5. The electronic transaction management system of claim 1, wherein executing transactions comprises executing an online order from a retail store system.

6. The electronic transaction management system of claim 1, wherein the custom logic routines are business rules.

7. The electronic transaction management system of claim 1, wherein the transaction manager and the business logic manager run in parallel.

8. The electronic transaction management system of claim 1, further comprising security software that uniquely identifies the user to the system transaction management system.

9. The electronic transaction management system of claim 1, wherein the transaction management system is a multitasking engine capable of executing a plurality of transactions simultaneously.

10. An electronic system configured to execute electronic transactions from a user over a network, comprising:
    a transaction manager configured to receive a transaction to be executed by the user;
    at least one database that stores user entitlements, screen settings and custom algorithms for the user;
    a presentation manager configured to determine the information that the user can view in an Internet browser based on the screen settings; and
    a business logic manager configured to make a call to the at least one database to determine an algorithm to execute for the transaction, wherein the transaction manager is configured to execute the transaction based on the determined algorithm.

11. The system of claim 10, wherein the transaction manager is configured to categorize the transaction into a business component handled by the business logic manager and a presentation layer which is handled by the presentation manager.

12. The system of claim 10, wherein the at least one database comprises information defining the functions that the user can perform in the system.

13. The system of claim 10, wherein the business logic manager is configured to apply business rules to further determine if there are any limitations on how the transaction can be executed by the user.

14. The system of claim 10, wherein the transaction is an online order and the system is an electronic retail store system.

15. The system of claim 10, wherein the system is hosted on one or more servers.

* * * * *